(No Model.) 4 Sheets—Sheet 2.
J. F. WALLACE.
MACHINE FOR BENDING LINKS.
No. 269,357. Patented Dec. 19, 1882.
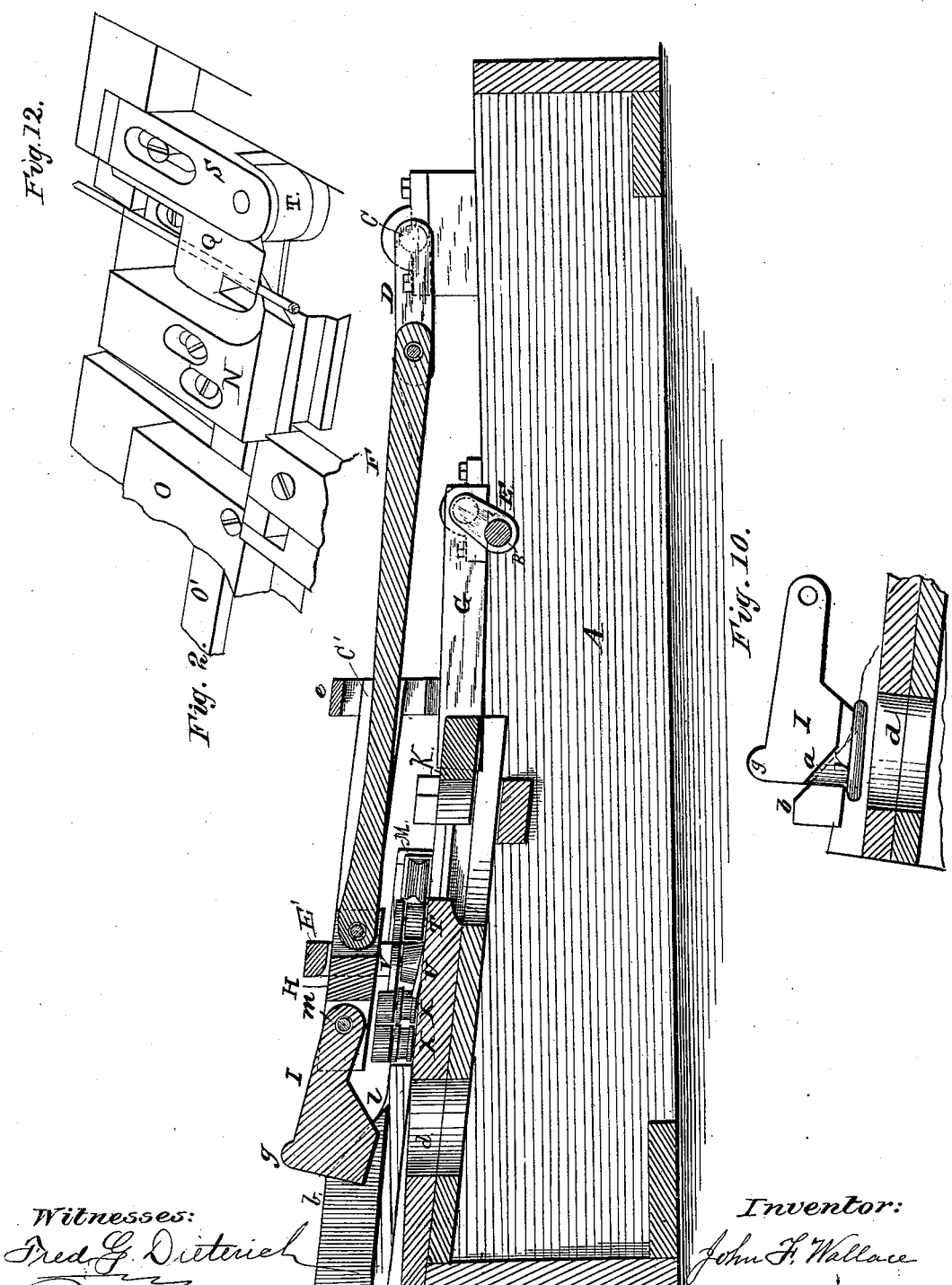
Witnesses:
Fred G. Dietrich
P. C. Dietrich
Inventor:
John F. Wallace
By J. J. Johnston
his attorney (No Model.) 4 Sheets—Sheet 3.
J. F. WALLACE.
MACHINE FOR BENDING LINKS.
No. 269,357. Patented Dec. 19, 1882.
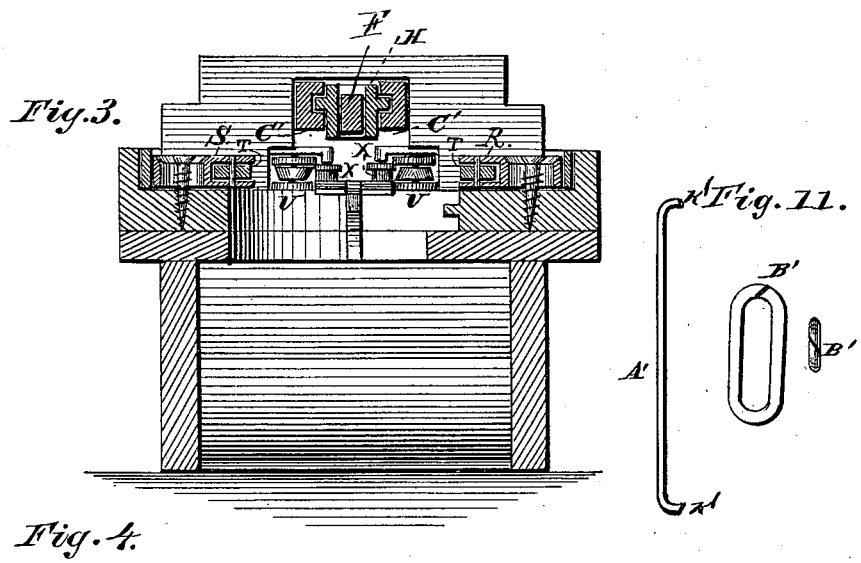
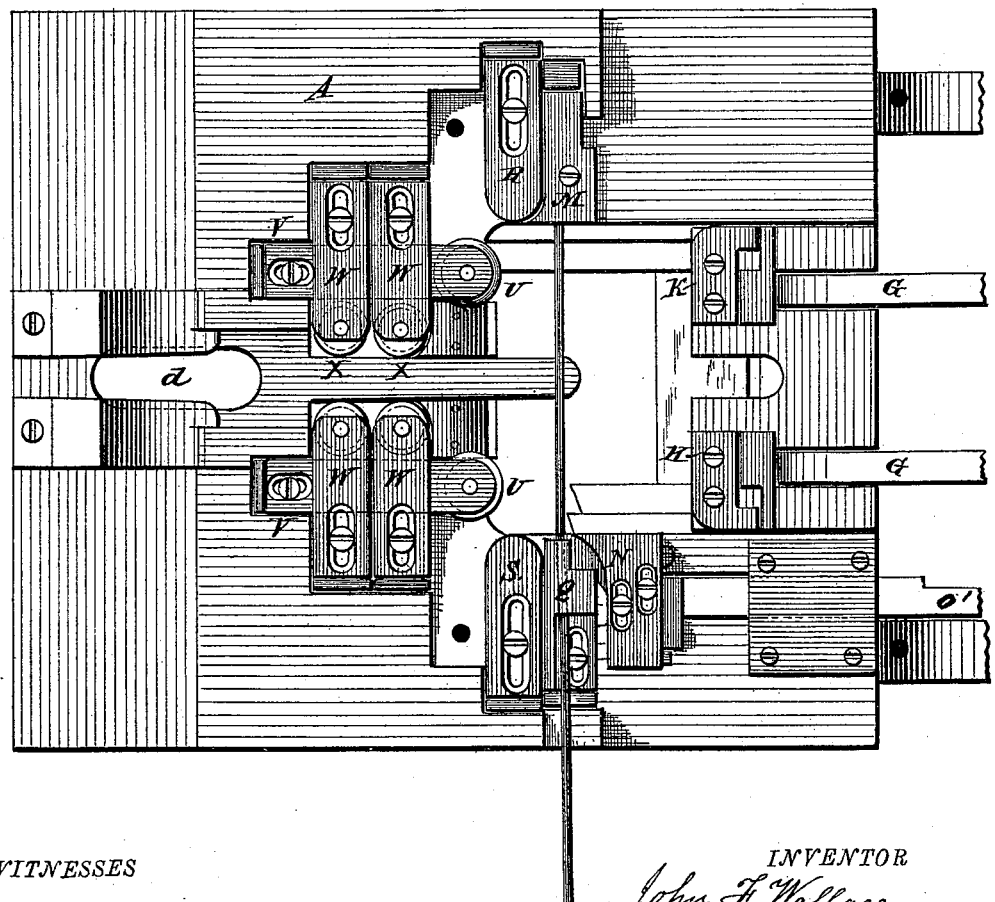
WITNESSES
Fred. G. Dieterich.
P. C. Dieterich.
By his Attorney
J. J. Johnston
INVENTOR
John F. Wallace (No Model.)  4 Sheets—Sheet 4.
J. F. WALLACE.
MACHINE FOR BENDING LINKS.
No. 269,357. Patented Dec. 19, 1882.
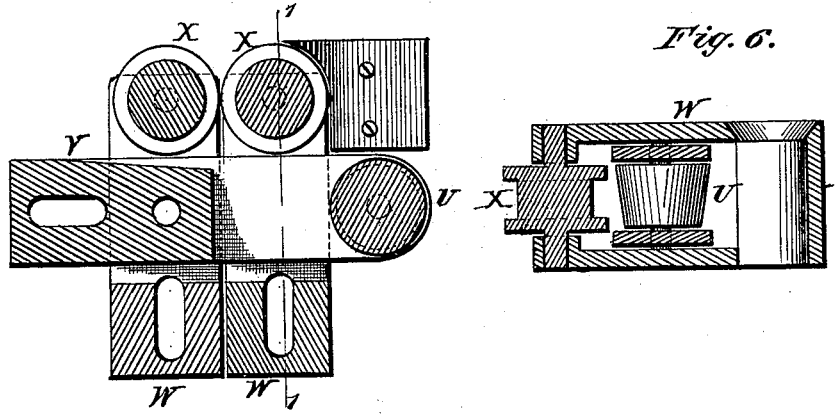
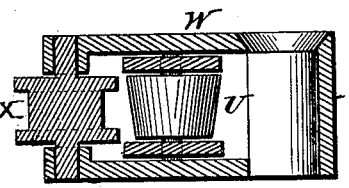
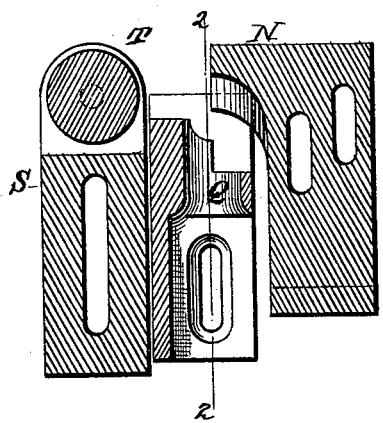
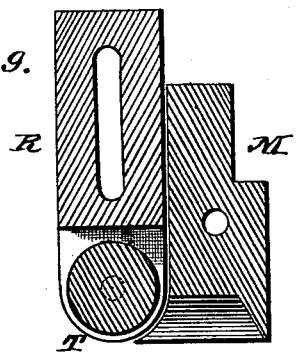
WITNESSES
INVENTOR
John F. Wallace
By his Attorney

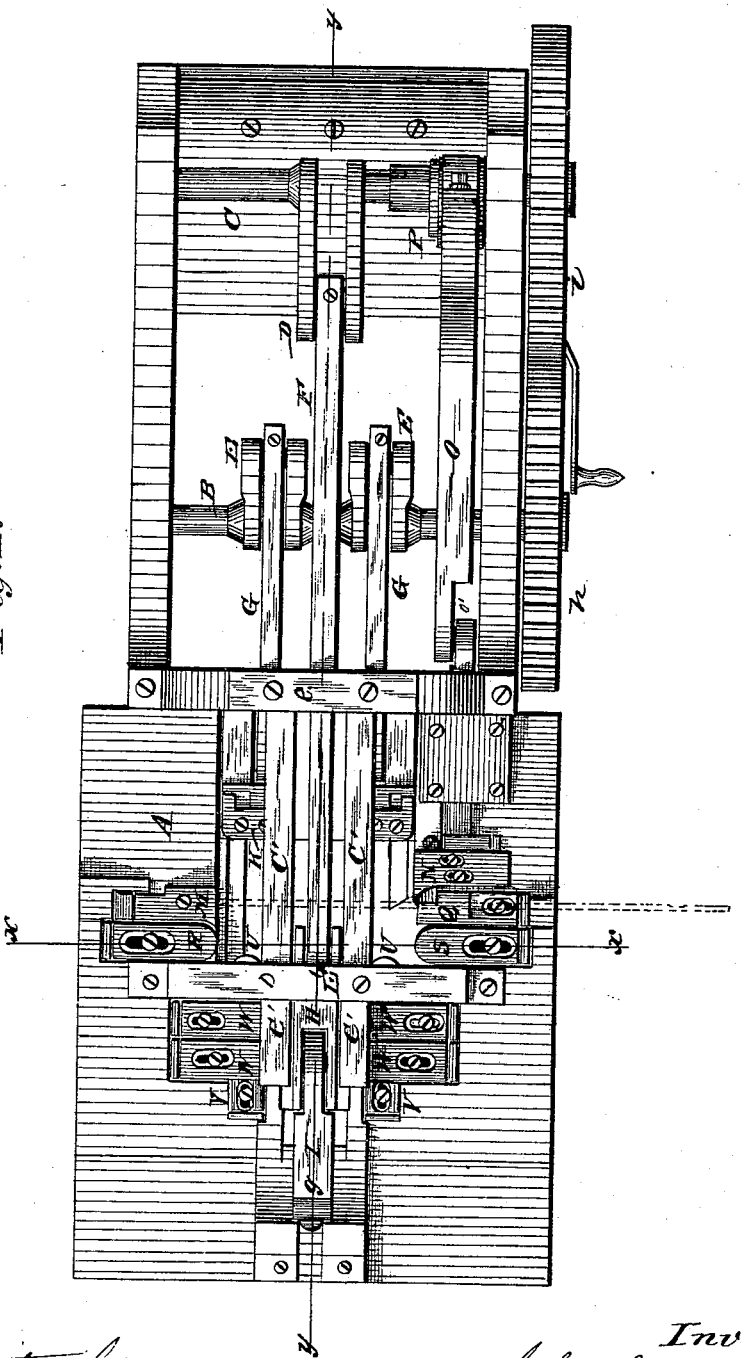

UNITED STATES PATENT OFFICE.

JOHN F. WALLACE, OF PITTSBURG, PENNSYLVANIA.

MACHINE FOR BENDING LINKS.

SPECIFICATION forming part of Letters Patent No. 269,357, dated December 19, 1882.

Application filed May 27, 1881. (No model.)

*To all whom it may concern:*

Be it known that I, JOHN F. WALLACE, of Pittsburg, in the county of Allegheny and State of Pennsylvania, have invented a new and useful Improvement in Machines for Bending Links; and I do hereby declare that the following is a full, clear, and exact description thereof, reference being had to the accompanying drawings, and to the letters of reference marked thereon.

My invention relates to an improvement in link-bending machines; and it consists in moving formers in combination with adjustable rollers and a guide-stop and cutter, arranged and operating with relation to each other in such manner that the iron for the formation of the link is gaged and separated from the bar from which the blank is cut. Then the two outer ends are bent so as to overlap, and are finally bent to the contour of a form corresponding to the size, form, and opening of the link, all of which will hereinafter more fully appear.

To enable others skilled in the art with which my invention is most nearly connected to make and use it, I will proceed to describe its construction and operation.

In the accompanying drawings, which form part of my specification, Figure 1 is a top view or plan of my improved link-bending machine. Fig. 2 is a vertical and longitudinal section of the same at line $y$ of Fig. 1. Fig. 3 is a transverse section at line $x$ $x$ of Fig. 1. Fig. 4 is a detail top view, representing several of the parts removed. Fig. 5 is a detail section of the horizontal rollers and their adjustable bearings. Fig. 6 is a detail vertical and longitudinal section of the rollers and adjustable bearing at line 1 in Fig. 5. Fig. 7 is a detail horizontal section of the cutter-anvil and tapering rollers on the right of the machine. Fig. 8 is a detail vertical section at line 2 of Fig. 7. Fig. 9 is a horizontal section of the guide-stop and tapering roller on the left of the machine. Fig. 10 is a detail section of the mandrel around which the link is formed, and the discharge device and opening in the machine. Fig. 11 represents the different steps in the bending of the link. Fig. 12 is a detail view, showing in perspective the cutter N and anvil Q, with a rod passing through said anvil and in position for being cut by the cutter N.

In the accompanying drawings, A represents the frame of the machine, in which are journaled crank-shafts B and C, having cranks D and E, to which are attached pitmen F and G.

To the pitman F is attached a cross-head, H, to which is attached a form, I.

To the pitmen G G is attached a form, K.

To the frame is attached an adjustable guide-stop, M, the construction of which is shown in Figs. 1, 2, and 9.

A cutter, N, is attached to a bar, $o'$, connected with a pitman, O', which is operated by an eccentric, P, on the crank-shaft C.

Forward of the cutter N is an adjustable anvil, Q, through which the iron passes, and in which it is supported during the operation of separating it from the bar from which the link is formed.

To the frame A are attached adjustable bearings R and S, in which are journaled rollers T for bending the ends of the link-blank, as shown at A' in Fig. 11.

To the frame A are also attached adjustable bearings V V, in which are journaled beveled rollers U, the working-faces of which are beveled in opposite directions for the purpose of throwing the bent ends of the blank which form the link on different planes, so that in the subsequent bending of said blank the bent ends will not strike each other.

In the frame A are also adjustable bearings W W, in which are journaled grooved or flanged rollers X. The form I at Y corresponds in size and form to the opening of the link, and is furnished with an incline at $a$, which incline travels up an incline, $b$, which strips the link from the part Y of the form I, which arrangement of parts is shown in Figs. 2 and 10.

Above the pitmen is a cross-bar, $e$, for the support of the guides C' for the cross-head H, and in which said guides move. Beyond the bar $e$ is another bar, E', (shown in Fig. 2,) the under side of which is inclined when viewed in cross-section, and this bar is employed to cause the form I to be brought in place for its proper action in the bending of the link, the form being forced into its proper position (in case it does not drop by its own gravity) by the projection $g$ striking against the under and inclined surface of the bar E'.

The proper movements of the cranks, pitmen, cutter, and forms are accomplished by means of gear-wheels h and i, secured on the crank-shafts B and C, which must be of such relative size that the movements of said cranks and pitmen will occur with relation to each other in the manner which will be described hereinafter.

From the foregoing description, and by reference to the accompanying drawings, the skillful mechanic will understand the construction and arrangement of the several parts and the relation which said parts bear to each other. I will therefore proceed to describe the operation, which is as follows: The several parts being arranged as hereinbefore described, the bar from which the link-blank is to be formed is placed in the machine, passing between the cutter N and anvil Q, with its inner end placed against the end of the guide-stop M. The wheels h and i being put in motion, the eccentric P operates the pitman O', which moves forward the cutter N, which cuts the blank for the link from the bar, the cutting-edge of the cutter being so formed and arranged with relation to the axis of the bar that it cuts through it at an angle, giving the desired scarf, as indicated in Fig. 11. The form K then moves forward and forces the iron down past the rollers T, which bend the blank into the form shown at A' in Fig. 11, and the reverse bevels on the rollers U throw one of the ends k up and the other down, so that the said ends will not strike each other while being bent around the part Y of the form I. At the same time that the crank E and pitmen G G are moving forward the form K the crank D and pitman F are moving back the form I, the form K holding the link-blank until the form I has passed over it, at which time the form K commences moving back. Then the form I moves forward and the end of the part Y strikes the center of the blank for the link, and, carrying it past the rollers U, causes the ends k' of the blank to assume the position shown at B' in Fig. 11. The form I, continuing its forward movement, causes the blank to pass between the flanged rollers X, bringing all parts of the axis of the blank on the same plane. The point l of the incline b passes between the incline a and the link and forces the link off the part Y of the form I, and the link then drops through the opening d into a suitable receptacle.

It will be observed that in the first operation of bending the link-blank by the form K its ends are bent by the operation of the form K in carrying the link forward past the rollers T T, and the ends of the blank which were in the first operation bent are by the rollers U brought upon different planes, and thereby the flanged rollers X are brought upon the same plane, and at the same time the blank is bent around the part Y of the form I.

I wish it also observed that the form I is pivoted at m to the cross-head H, this being a material part of my invention, for by thus pivoting said form it is allowed to travel over the link-blank, and when said blank is bent around it after passing between the flanged rollers X it travels up an incline, which, as before stated, removes the bent link from off the form. Links thus formed are heated and welded in the usual way and by any of the known means.

What I claim as of my invention is—

1. In the link-bending machine hereinbefore described, the combination of the cutter N, anvil Q, guide-stop M, adjustable bearings R S, provided with rollers T T, form K, adjustable bearings V V, each provided with a beveled roller, U, adjustable bearings W, each furnished with a flanged roller, X, form I, and operating mechanism, as and for the purpose specified.

2. In the link-bending machine hereinbefore described, the combination of the cutter N, anvil Q, guide-stop M, form K, adjustable bearings R S, each provided with a roller, T, and operating mechanism, substantially as and for the purpose specified.

3. In the link-bending machine hereinbefore described, the combination of the cutter N, anvil Q, guide-stop M, form K, adjustable bearings R S, each provided with a roller, T, form I, adjustable bearings V, each provided with a beveled roller, U, and operating mechanism, substantially as and for the purpose specified.

4. In the link-bending machine hereinbefore described, the combination of the cutter N, anvil Q, guide-stop M, form K, adjustable bearings R S, each provided with a roller, T, form I, adjustable bearings V, each provided with a beveled roller, U, adjustable bearings, each furnished with a flanged roller, X, incline b, having point l, and operating mechanism, substantially as and for the purpose specified.

JOHN F. WALLACE.

Witnesses:
A. C. JOHNSTON,
J. J. JOHNSTON.